March 19, 1935.  H. WOOLARD  1,995,137

AMUSEMENT APPARATUS

Original Filed Jan. 29, 1932  2 Sheets-Sheet 1

Inventor:
Herbert Woolard,
Harry Cohn
Att'y.

March 19, 1935.  H. WOOLARD  1,995,137
AMUSEMENT APPARATUS
Original Filed Jan. 29, 1932  2 Sheets-Sheet 2
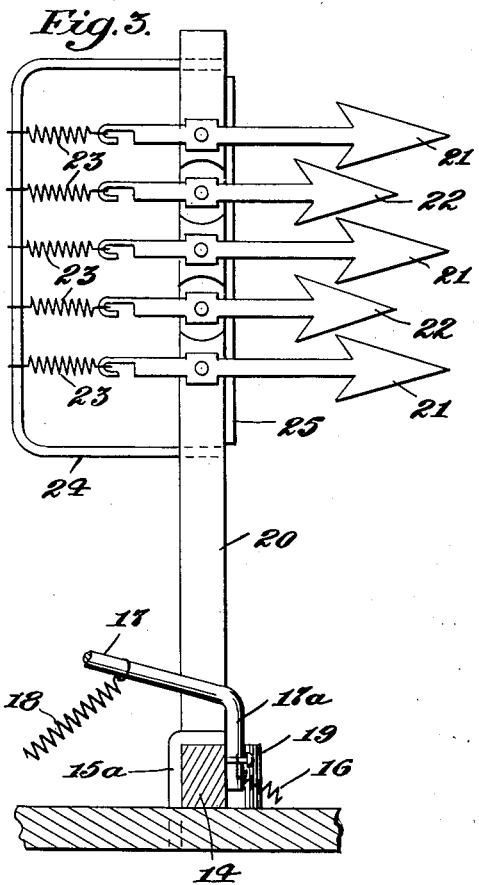
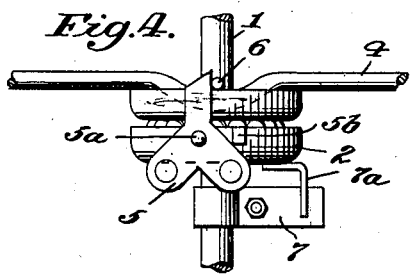
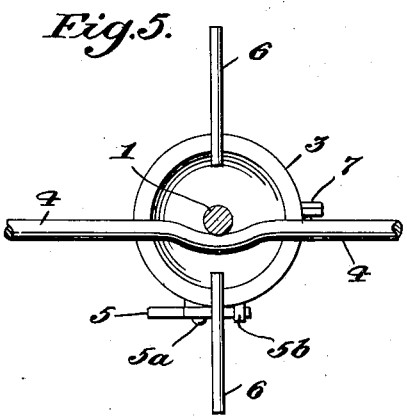
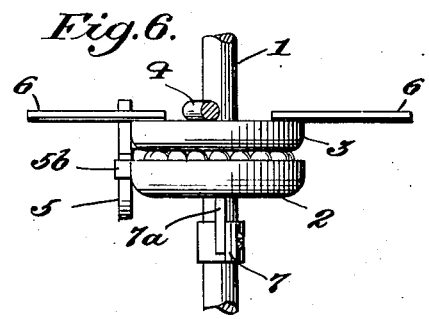
Inventor:
Herbert Woolard,
Harry Cole
Att'y.

Patented Mar. 19, 1935

1,995,137

UNITED STATES PATENT OFFICE 1,995,137

AMUSEMENT APPARATUS

Herbert Woolard, Clarksburg, W. Va., assignor to Rock-ola Mfg. Co., Chicago, Ill., a corporation of Illinois Application January 29, 1932, Serial No. 589,718
Renewed August 11, 1934

18 Claims. (Cl. 273—86)

The present invention relates to an amusement apparatus and more particularly to such an apparatus for simulating racing of horses, automobiles, dogs, boats, etc.

The main object of the invention is the provision of race simulating apparatus whereby several objects that participate in the race move independently of each other.

Another object of the invention is to provide an improved operating mechanism whereby to improve the degree of variation of movement of the racing objects.

Another object of the invention is the provision of a stop device for bringing the contestants to rest.

A further object of the invention is generally to improve the construction and operation of an amusement apparatus of this character.

For a complete understanding of my invention reference is to be had to the accompanying drawings which illustrate the preferred embodiment of the invention.

In the drawings:

Fig. 3 is a view of the stop device on the line 3—3 of Fig. 2;

Fig. 4 is a side view of a portion of the shaft and associated members;

Fig. 5 is a top plan view of the mechanism shown in Fig. 4;

Fig. 6 is a side view at right angles to Fig. 4.

Figure 1:
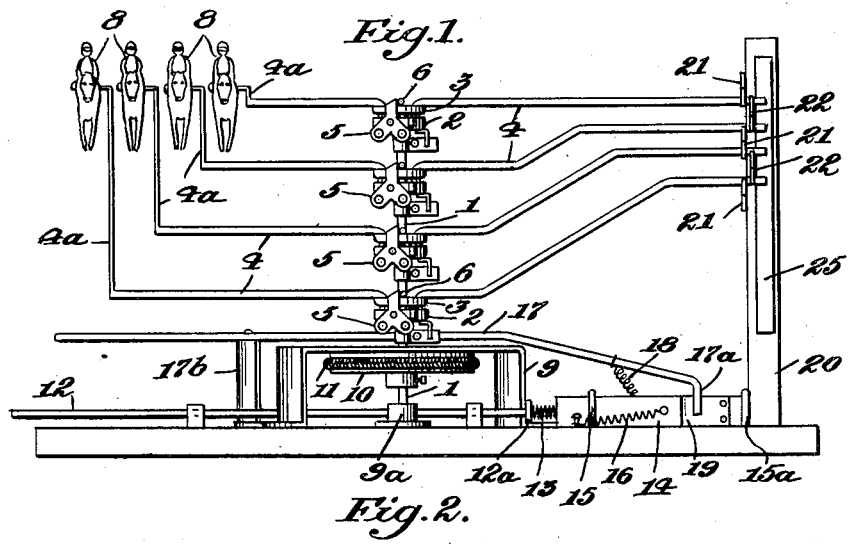
Fig. 1 is a side view of the apparatus.

As here shown, the apparatus comprises a vertical shaft 1 rotatably mounted intermediate the ends thereof in a bearing and bracing strap 9, the lower end of the shaft 1 being mounted in a suitable bearing 9a. A ball bearing cup member 2 is rigidly secured to the shaft 1 in concentric relation therewith by a clamp device 7 and an attached bracket 7a and rotates with the shaft when the latter is actuated. A carriage member, here shown as a plate 3, is supported on the balls of the ball bearing member 2 concentric with the shaft 1 and can rotate freely about said shaft. Said member 3 has one or more arms 6 secured thereto, said arms projecting beyond the circumference of member 3 in the path of movement of one or more driving members 5 carried by member 2. Said driving members 5 are constructed and arranged to permit the arms 6 to ride thereover in one direction but engage said arms in the opposite direction thereby to impart movement to plate 3 and to permit the latter to rotate independently at a speed different from, preferably faster than, that of the shaft 1 and member 2. For this purpose said members 5 can be pivotally mounted at 5a, as shown, and a stop member 5b is provided to engage the lower part of members 5 to prevent movement thereof in one direction and to permit movement thereof in the opposite direction, whereby said members 5 and arms 6 function like a pawl and ratchet mechanism. The lower part of the driving member 5 can be weighted thereby tending to maintain member 5 in vertical position.

Figure 2:
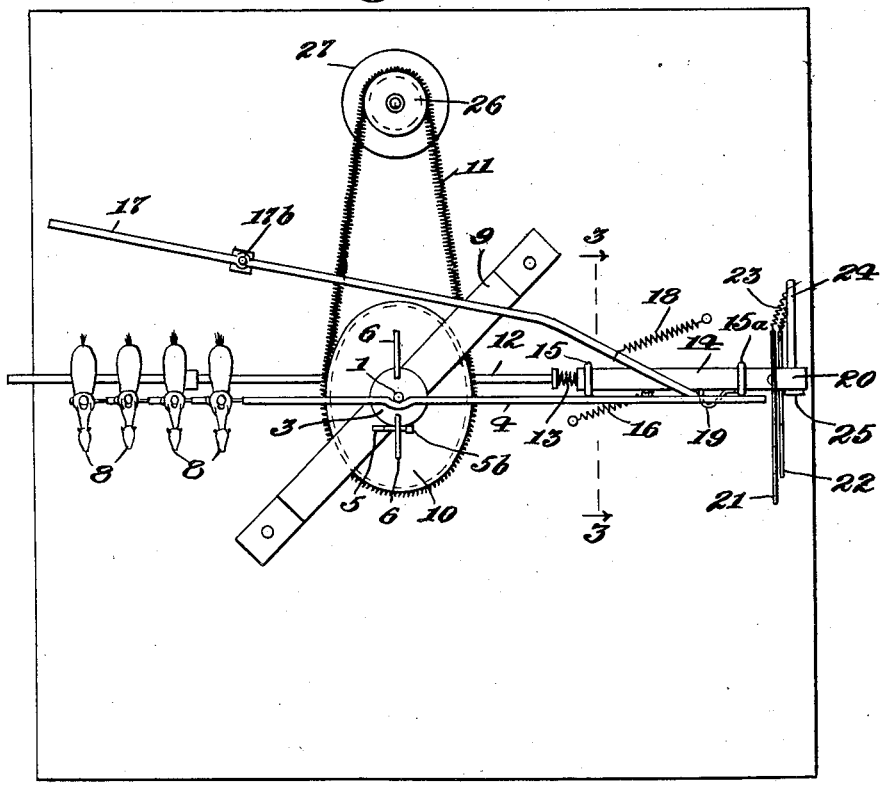
Fig. 2 is a top plan view.

A horizontal carriage arm 4 is secured to carriage member 3, and is provided with a vertical portion 4a which carries the racing object 8, here shown as a horse and jockey, but which can be any other object. The racing object is thus freely rotatable about shaft 1. The shaft 1 is operated by a pulley 10 which as shown is preferably non-circular, such as an oval or elliptical shaped pulley. The non-circular pulley 10 constitutes means to periodically vary the rate of rotation of shaft 1. This has been found to be desirable as it improves the operation of moving the objects to closely simulate a race. The pulley 10 is operated by an extensible belt 11, here shown as a spiral spring. The belt 11 is operated by a driving pulley 26 preferably driven at constant speed by a spring operated motor 27 which may be coin-controlled. As coin-controlled motors are well known in the art and form per se no part of the present invention, I have not considered necessary to illustrate the same, it being understood that any suitable motor may be employed for my purposes. The operation of the parts thus far described consists in the actuation of the shaft 1 by means of the pulley 10, the rotation of the bearing-member 2 secured to said shaft, and the rotation of the plate 3 by the blows or taps delivered by the driving members 5 to the arms 6, the rotation of said plate 3 serving to rotate the carriage arm 4 by which the object 8 is carried. As shown in Figs. 1 and 2, the apparatus comprises a plurality of bearing members 2, 3 disposed one above the other in spaced relation on the shaft 1 with the racing objects 8 arranged preferably in the same horizontal plane and with the vertical portions 4a of the carriage arms progressively nearer the shaft 1.

The apparatus comprises a stop device whereby to bring the racing objects to rest after a predetermined time. As here shown, said stop device comprises a horizontal bar 14 arranged to slide in guides 15 and 15a, and a vertical post 20 carried by or secured to the bar 14. A spring 16 holds the bar 14 in the position shown when the stop device is operative, the guide member 15a serving as an abutment to limit the movement of the bar 14 by spring 16. Said bar 14 can be moved against the tension of the spring 16 by a push-rod 12 which carries push-plate 12a and a spring 13 which are adapted to engage the proximate end of the bar 14 to move the latter. Said push-rod 12 may be operated to move the bar 14 by hand or automatically by suitable mechanism (not shown) operated by the coin-controlled mechanism. Means are provided for releasably holding the bar 14 in extended position beyond the path of the carriage arms 4. For this purpose, the bar 14 is provided with a keeper 19 which is releasably engaged by the end 17a of a latch rod 17 provided with a spring 18 which tends to hold the end 17a in engagement with the keeper 19. The latch rod 17 has a suitable pivot 17b and is arranged to release the keeper 19 after a predetermined time. For this purpose the latch rod 17 can be actuated by hand or automatically by the spring motor which operates the shaft 1 or any other suitable timing device. As shown in Fig. 1, the latch is out of operative position and the stop device is in the path of the carriage arms 4 in position to bring the racing objects to rest. When in operative position to maintain the post 20 out of the path of the carriage arms the end 17a on the rod 17 engages the forward edge of the keeper 19 as shown in Fig. 2. A plurality of members 21 and 22 are pivotally mounted on the post 20, as shown and are held in horizontal position by springs 23 which are secured to said members 21 and 22 and to a holder 24 secured to the post 20. Said members 21 and 22 have arrow-heads as shown and can move with respect to each other whereby to permit the carriage arms 4 to enter therebetween and to pass beyond the arrow-heads in position against the post 20. Said post 20 is provided with a resilient device 25 which acts to cushion the carriage arms 4 as they are brought to rest. It will be understood that the ends of the carriage arms 4 nearest the post 20 in the position shown in Fig. 1 are adapted to engage a pair of members 21 and 22 and to pass therebetween into engagement with the post 20 when the stop member is in position for arresting the movement of the racing objects, and that the sections of the arms 4 between the vertical portion 4a and the shaft 1 are short enough to permit the racing objects 8 to move past the post 20 when the latter is in said position for engagement by the opposite ends of said arms. Said members 21 and 22 constitute means to hold the carriage arms 4 from movement away from the post 20 when the latter is in the path of movement of said carriage arms.

In operating the apparatus, when a coin-controlled mechanism is employed the deposit of a coin in the coin-controlled motor mechanism starts the motor for driving the belt 11 and actuates the push-rod 12 whereby to move the stop device out of engagement with the carriage arms 4 in which position said stop device is held by the latch rod 17 which engages the keeper 19 on the bar 14. Upon release of said carriage arms 4 by the stop device, the shaft 1 rotates the objects 8 through the ball bearing members 2, 3 and the associated parts as above described. The elliptical or oval shaped pulley shown has been found to actuate the shaft 1 in such a way as to produce a variation in the movements of the racing objects through the ball bearing members 2, 3 and the associated parts whereby to more closely simulate a race. After a predetermined length of time or after a predetermined number of revolutions of said objects about the shaft 1 the latch rod 17 is released, assuming the position shown, when the stop device is brought into position so that the carriage arms 4 engage the members 21 and 22 and subsequently the post 20 whereupon the objects are brought to rest. When the apparatus is not coin-controlled, or is otherwise not automatically controlled, the push rod 12 is manually operated to release the arms 4 whereupon the belt 11 can be actuated in any suitable manner to rotate the pulley 10, and after the apparatus has been in operation for the desired length of time the latch rod 17 is released manually to permit the post 20 to move inwardly into position to engage the arms 4 to arrest the movement of the racing objects. It will be understood that the apparatus can be provided with any suitable device to indicate the starting and finishing positions for the race. While I have shown and described the preferred embodiment of my invention it will be understood that the same is susceptible of changes in the construction and arrangement of the various parts. Therefore, it is to be understood that I do not wish to be limited to the exact construction shown except as may be required by the appended claims and the prior art.

Having thus described my invention what I desire to claim and secure by Letters Patent of the United States is:

1. In race-simulating apparatus, a rotatable shaft, racing objects freely rotatable about said shaft, means actuated by said shaft for imparting movement to said objects about said shaft, a non-circular pulley for actuating said shaft and means for operating said pulley.

2. In race-simulating apparatus, a rotatable shaft, racing objects freely rotatable about said shaft, means actuated by said shaft for imparting movement to said objects about said shaft, a non-circular pulley for actuating said shaft and an extensible belt for operating said pulley.

3. In race-simulating apparatus, a rotatable shaft, a ball-bearing member secured to said shaft and rotatable therewith, a carriage-member supported by said ball-bearing member freely movable thereon about said shaft, means on said two members for imparting movement to said carriage-member in one direction only, and a racing object carried by said carriage-member.

4. In race-simulating apparatus, a rotatable shaft, a cup-member secured to said shaft and rotatable therewith, ball-bearings in said cup-member, a plate supported by said balls freely rotatable thereon about said shaft, a racing object adapted to be moved by said plate about said shaft, and means for transmitting movement of said shaft to said plate.

5. In race-simulating apparatus, a rotatable shaft, a cup-member secured to said shaft and rotatable therewith, ball-bearings in said cup member, a plate supported by said balls freely rotatable thereon about said shaft, a racing object adapted to be moved by said plate about said shaft, and means on said cup-member and on said plate for imparting movement thereto in one direction only.

6. In race-simulating apparatus, a rotatable shaft, a ball-bearing member fixed to said shaft, a carriage member supported by said ball-bearing member and freely rotatable thereon, a carriage arm carried by said carriage member, and a stop device movable into and out of the path of said carriage arm.

7. In race-simulating apparatus, a rotatable shaft, a rotatable carriage member mounted on and operated by said shaft, a carriage-arm carried by said carriage member, and a stop device normally positioned out of the path of said arm until the end of the race and movable into the path of said arm for arresting the movement thereof at the end of the race.

8. In race-simulating apparatus, a rotatable shaft, a rotatable carriage member mounted on and operated by said shaft, a carriage-arm carried by said carriage member, a stop device normally positioned out of the path of said arm until the end of the race and movable into the path of said arm for arresting the movement thereof at the end of the race, and means for releasably holding said stop device beyond the path of said arm.

9. In race-simulating apparatus, a rotatable shaft, a rotatable carriage member operated by said shaft, a carriage-arm carried by said carriage member, and a stop device movable into and out of the path of said arm, comprising a pair of spring-held members adapted to be engaged by said carriage arm.

10. In amusement apparatus, a rotatable carriage arm, means for rotating said arm, a post movable into and out of the path of said arm, and means to hold said arm from movement away from said post when the latter is in the path of said arm.

11. In amusement apparatus, a rotatable carriage arm, means for rotating said arm, a post movable into and out of the path of said arm, and a pair of arrow-head members pivotally mounted on said post adapted to be engaged by said carriage arm when the post is in its path whereby said arm can pass therebetween into engagement with said post and is held against release until the post is moved out of the path of said arm.

12. In amusement apparatus, a rotatable carriage arm, means for rotating said arm, a post movable into and out of the path of said arm, means for moving said post away from said arm, a latch for holding said post out of the path of said arm, means for releasing said latch, and means operative upon release of the latch to move said post into the path of said arm.

13. In race-simulating apparatus, a shaft rotatable continuously in one direction, racing objects rotated by said shaft, and free to rotate independently of each other, and means for periodically varying the rate of rotation of said shaft.

14. In race-simulating apparatus, a rotatable shaft, racing objects rotated by said shaft in one direction only and free to rotate independently of each other, an oval shaped pulley for rotating said shaft, and a spiral-spring belt for operating said pulley.

15. In race-simulating apparatus, a rotatable shaft, racing objects rotated by said shaft in one direction only and free to rotate independently of each other, an oval shaped pulley for rotating said shaft, and an extensible belt for operating said pulley.

16. In a race-simulating apparatus, a rotatable shaft, racing objects freely rotatable about said shaft, means actuated by said shaft for imparting movement to said objects about said shaft, and a driving means for actuating said shaft continuously in one direction at varying speeds, and means for actuating said driving means.

17. In race-simulating apparatus, a shaft rotatable continuously in one direction, racing objects rotated by said shaft, and free to rotate independently of each other, driving means for varying the rate of rotation of said shaft, and means for operating said driving means.

18. In race-simulating apparatus, a rotatable shaft, racing objects rotated by said shaft and free to rotate independently of each other, a non-circular pulley for rotating said shaft, and means for operating said pulley.

HERBERT WOOLARD.